(12) United States Patent
Foulon et al.

(10) Patent No.: US 12,651,074 B2

(45) Date of Patent: Jun. 9, 2026

(54) DETERMINING SECURITY VULNERABILITIES BASED ON CYBERSECURITY KNOWLEDGE GRAPHS

(71) Applicant: Capital One Services, LLC, McLean, VA (US)

(72) Inventors: Christophe Foulon, McLean, VA (US); Vincent Gutosky, McLean, VA (US); Glen A. Wilson, Glen Allen, VA (US); Robert Seastrom, McLean, VA (US); John Watson, Falls Church, VA (US); Paul Warner, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 139 days.

(21) Appl. No.: 18/501,679

(22) Filed: Nov. 3, 2023

(65) Prior Publication Data

US 2025/0148084 A1 May 8, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ...... G06F 21/57; G06F 21/566; G06F 21/552; G06F 2221/033; G06F 21/554; G06F 2221/034; G06F 21/577; G06F 21/06; H04L 63/1425; H04L 63/20; H04L 63/1433

See application file for complete search history.

(56) References Cited

U.S. PATENT DOCUMENTS

| | | | | |
|---|---|---|---|---|
| 11,070,582 | B1 * | 7/2021 | Berger | H04L 63/1433 |
| 12,020,140 | B1 * | 6/2024 | Mondlock | G06N 3/0455 |
| 12,039,263 | B1 * | 7/2024 | Mondlock | G06F 40/20 |
| 12,079,570 | B1 * | 9/2024 | Mondlock | G06F 40/20 |
| 12,197,483 | B1 * | 1/2025 | Shmukler | G06F 40/284 |
| 2024/0121125 | A1 * | 4/2024 | Blair | G06F 40/263 |
| 2024/0203119 | A1 * | 6/2024 | Ma | G06V 20/70 |
| 2024/0378399 | A1 * | 11/2024 | Gandhi | G06F 16/345 |
| 2024/0420012 | A1 * | 12/2024 | Austin | G06N 20/00 |
| 2025/0036878 | A1 * | 1/2025 | Marwah | G06F 40/30 |
| 2025/0077590 | A1 * | 3/2025 | Tobin | G06F 16/951 |
| 2025/0077625 | A1 * | 3/2025 | Coleman | G06F 21/64 |
| 2025/0131247 | A1 * | 4/2025 | Mondlock | G06N 3/0475 |
| 2025/0139263 | A1 * | 5/2025 | Sne | H04L 63/102 |

* cited by examiner

*Primary Examiner* — Ninos Donabed

(74) *Attorney, Agent, or Firm* — Foley & Lardner LLP

(57) ABSTRACT

Some embodiments may include methods and related systems to receive a query associated with an access level and determine a set of documents based on the query and a knowledge graph, where the set of documents is associated with a set of tags, a set of directives, and a set of criteria. Some embodiments may then determine a score based on the set of directives, determine whether the access level satisfies the set of criteria, and, in response to a result indicating that the access level satisfies the set of criteria, associate a set of text identifiers with the score by tracing the set of tags. Some embodiments may then store, in a set of database records, the score and the set of text identifiers.

18 Claims, 3 Drawing Sheets

DETERMINING SECURITY VULNERABILITIES BASED ON CYBERSECURITY KNOWLEDGE GRAPHS

SUMMARY

A large language model (LLM) is capable of using connections between information of disparate documents to create new combinations of this information. Many such models are trained to learn the rules governing the relationships between interdependent tokens across a large corpus of documents. These LLMs are applicable in a variety of settings, such as cybersecurity and anomalous issue response. The relative speed at which an LLM may formulate unique responses that are comprehensible to humans or other machine systems may make LLMs an important tool in real-time response strategy generation for cybersecurity issues.

In many cases, LLM configuration may involve training the LLM on a specific dataset. Such training operations map equivalent tokens as being the same, regardless of source document, and systems that use such training operations may make it difficult to trace a response generated by the system to a single exact document. Moreover, LLM models have a likelihood to hallucinate new responses that may seem superficially accurate but are in fact inaccurate and contrary to established knowledge. Furthermore, in many cases, reference information to support an LLM output may itself be classified to a certain security category such that the presentation of such information to all providers of a query may create significant security concerns. Such issues may prevent the adoption of LLM systems to support various types of critical operations.

Methods and systems are described in this disclosure to account for these technical issues and other issues. Some embodiments may retrieve text identifiers of documents used by an LLM to determine security vulnerabilities based on cybersecurity knowledge graphs. Some embodiments may do so while generating a vulnerability score in response to a query by displaying the sources used by a cybersecurity knowledge graph to generate the score. The query may indicate a potential vulnerability in a computing system, and some embodiments may autonomously generate a query based on a detected breach event, unauthorized login attempt, or other anomalous activity.

Alternatively, or additionally, some embodiments may receive or otherwise obtain a query indicating a vulnerability from a user with a user access level. Some embodiments may then determine a set of documents based on a knowledge graph in response to the query, where the set of documents is associated with a set of unique tags, a set of directives, and a set of access levels. To do so, some embodiments may determine a set of most similar documents based on the cybersecurity knowledge graph. Some embodiments may then generate a vulnerability score using vulnerability directives of the set of most similar documents.

After or while generating the vulnerability score, some embodiments may determine that the user access level satisfies a set of criteria based on the set of access levels of the set of documents. Some embodiments may then associate a set of text identifiers of the set of documents with the score by tracing the set of unique tags to determine the set of text identifiers in response to the determination that the user access level satisfies the set of criteria. Some embodiments may then present, in a user interface (UI), the score and the set of text identifiers.

Various other aspects, features, and advantages will be apparent through the detailed description of this disclosure and the drawings attached hereto. It is also to be understood that both the foregoing general description and the following detailed description are examples and not restrictive of the scope of the invention.

Figure 1:
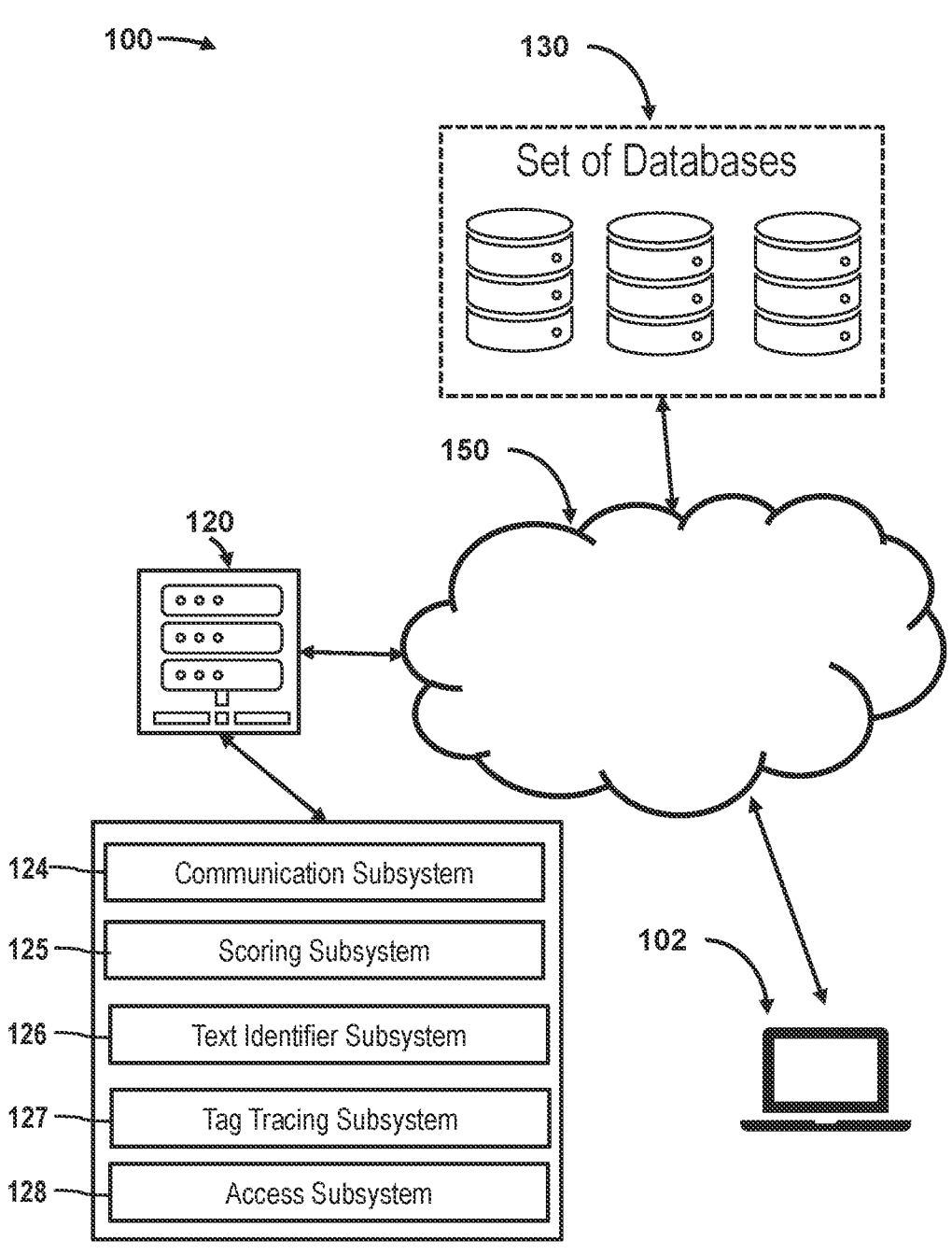
FIG. 1 shows an illustrative diagram of a system for determining security vulnerabilities based on cybersecurity knowledge graphs, in accordance with one or more embodiments.

The technologies described herein will become more apparent to those skilled in the art by studying the detailed description in conjunction with the drawings. Embodiments of implementations describing aspects of the invention are illustrated by way of example, and the same references may indicate similar elements. While the drawings depict various implementations for the purpose of illustration, those skilled in the art will recognize that alternative implementations may be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an illustrative diagram of a system for determining security vulnerabilities based on cybersecurity knowledge graphs, in accordance with one or more embodiments. The system 100 includes a client computing device 102. While shown as a laptop computer, it should be noted that the client computing device 102 may include other types of computing devices such as a desktop computer, a tablet computer, a hand-held computer, and other computer equipment (e.g., a server), a "smart" device, a wireless device, a wearable computing device, or other types of mobile computing devices, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a set of servers 120, where the set of servers 120 may include a set of non-transitory storage media storing program instructions to perform one or more operations of subsystems 124-128. While one or more operations are described herein as being performed by particular components of the system 100, those operations may be performed by other components of the system 100 in some embodiments. For example, one or more operations described in this disclosure as being performed by the set of servers 120 may instead be performed by the client computing device 102. Additionally, or alternatively, multiple users may interact with one or more components of system 100. For example, a first user and a second user may interact with system 100 using two different mobile computing devices, where the first user may use the client computing device 102 to input a query. The client computing device 102 may also present, on a display component of the client computing device 102, a score and an associated set of text identifiers in response to the query. Furthermore, some embodiments may communicate with an application programming interface (API) of a third-party service via the network 150 to perform various operations disclosed herein.

The system 100 is configured to receive a query associated with an access level and determine and present a set of documents stored in the set of databases 130 based on the query and a knowledge graph retrieved from the set of databases 130. For example, some embodiments may obtain a query from the client computing device 102, where the query may relate to a potential cybersecurity vulnerability. The set of documents stored in the set of databases 130 may be included within a corpus, wherein the corpus may include internal organization literature, numerical operations and figures, data retrieved from publicly available sources, etc. Some embodiments perform a series of preprocessing steps on the query (e.g., tokenizing, lemmatizing, removing stop words, etc.) and submit the preprocessed query to an Information Retrieval (IR) system, which returns the set of documents stored in the set of databases 130 based on a relevancy score. This operation may include using a knowledge graph or a prediction model that has been trained based on the knowledge graph, where some embodiments may use the knowledge graph to also determine the set of documents associated with the knowledge graph. The relevancy score may be measured by comparing the contents of the set of documents against the query, such as by performing a term frequency-inverse document frequency process.

In some embodiments, the set of servers 120 may implement or otherwise use a scoring subsystem 125, a communication subsystem 124, a text identifier subsystem 126, a tag tracing subsystem 127, and an access subsystem 128. The set of servers 120 may be located on one or more on-premises servers, be implemented as a set of applications executing on a cloud computing platform, or be otherwise accessible via the network 150. In some embodiments, program instructions to execute one or more of the operations described in this disclosure may be stored in one or more non-transitory, computer-readable media.

In some embodiments, the communication subsystem 124 may retrieve information such as a query, model parameters of an LLM, one or more documents of a corpus, user information, etc. For example, the communication subsystem 124 may obtain a query provided by the client computing device 102. The communication subsystem 124 may further send instructions to perform one or more actions or send data to other computing devices, such as data causing the client computing device 102 to present information retrieved or generated by one or more systems described in this disclosure. For example, some embodiments may generate, with the set of servers 120, data comprising a generated vulnerability score and an associated set of text identifiers or send such data to the client computing device 102.

In some embodiments, cloud components in communication with the communication subsystem 124 may access the set of databases 130, the client computing device 102, or the set of servers 120. In some embodiments, the cloud component may retrieve model parameters of a prediction used in this disclosure, which may include parameters for an LLM, another language model, a classification model, another prediction model, a statistical model, etc. (which may be referred to collectively as "models" herein).

In some embodiments, the scoring subsystem 125 may determine a score representing a vulnerability using one or more operations described in this disclosure. To determine a score, the scoring subsystem 125 may retrieve a set of directives of the knowledge graph from the set of databases 130, where the set of directives is stored in or otherwise associated with a set of documents stored in the set of databases 130. The knowledge graph retrieved from the set of databases 130 may take inputs, provide outputs, and may include multiple datasets, such as a training dataset and a test dataset. Each of the plurality of datasets (e.g., inputs) may include data subsets related to user data, predicted forecasts and/or errors, and/or actual forecasts and/or errors. In some embodiments, outputs may be fed back to the knowledge graph retrieved from the set of databases 130 as input to train the knowledge graph retrieved from the set of databases 130 (e.g., alone or in conjunction with user indications of the accuracy of outputs, with labels associated with the inputs, or with other reference feedback information). For example, the system may receive a labeled feature input, wherein the labeled feature input is labeled with a known prediction for the labeled feature input. The system may then train a model to classify the labeled feature input with the known prediction. For example, the system may determine a predicted cost of a hypothetical cybersecurity attack posed by a query.

The set of directives may include numerical operations and figures that are associated with the query. For example, some embodiments may include a set of directives indicating operations for computing a geometric Brownian motion based on a determination that the set of directives is relevant to a query concerning the potential price of an asset after it has been pirated. The score may be a vulnerability score that includes a final result determined by completing such operations in response to the query. The score may be determined using figures provided in the query, in the set of directives, by other information obtained via the communication subsystem 124, or by other information provided to the scoring subsystem 125.

In some embodiments, the text identifier subsystem 126 may perform text identifier association. For example, the set of documents stored in the set of databases 130 may be associated with a set of tags of the knowledge graph retrieved from the set of databases 130. These associations may be used to determine associations between the score and the set of text identifiers, where the text identifiers may include document-identifying tags or more specific identifiers of a specific portion of a document. For example, the system 100 may use the knowledge graph retrieved from the set of databases 130 to parse the score for the composite directives used in its calculation and then trace each directive to its original document from the set of documents using the tag associated with that document.

In some embodiments, the tag tracing subsystem 127 may perform tracing operations to associate text identifiers with the generated scores. For example, the tag tracing subsystem 127 may associate text identifiers with the score by including a text citation of the originating document for a directive and storing the text citation with the associated directive and the generated score. For example, some embodiments may store the text citations (or other text identifiers) in a record of a set of database records. In some embodiments, the tag tracing subsystem 127 may perform operations similar to or the same as those described for a tag tracing subsystem 227 described below. For example, the tag tracing subsystem 127 may associate the set of text identifiers with the generated score by tracing a set of tags, where the set of tags may identify the set of documents or be otherwise associated with the set of documents.

In some embodiments, the access subsystem 128 may determine whether a user has the appropriate access parameters to view a set of retrieved documents. The access subsystem 128 may associate the set of text identifiers with the score by using the tag tracing subsystem 127 to trace the set of tags. Some embodiments may trace the set of tags in response to a result indicating that the access level satisfies a set of criteria associated with the set of documents. For example, the set of criteria may include a security level if the set of documents contain sensitive or valuable information. Furthermore, some embodiments may use a set of directives from the set of documents to calculate a score but exclude, obfuscate, redact, or alter the identifiers for the set of documents to preserve the security of the set of documents in response to a result indicating that the access level of the query does not satisfy the security level.

Figure 2:
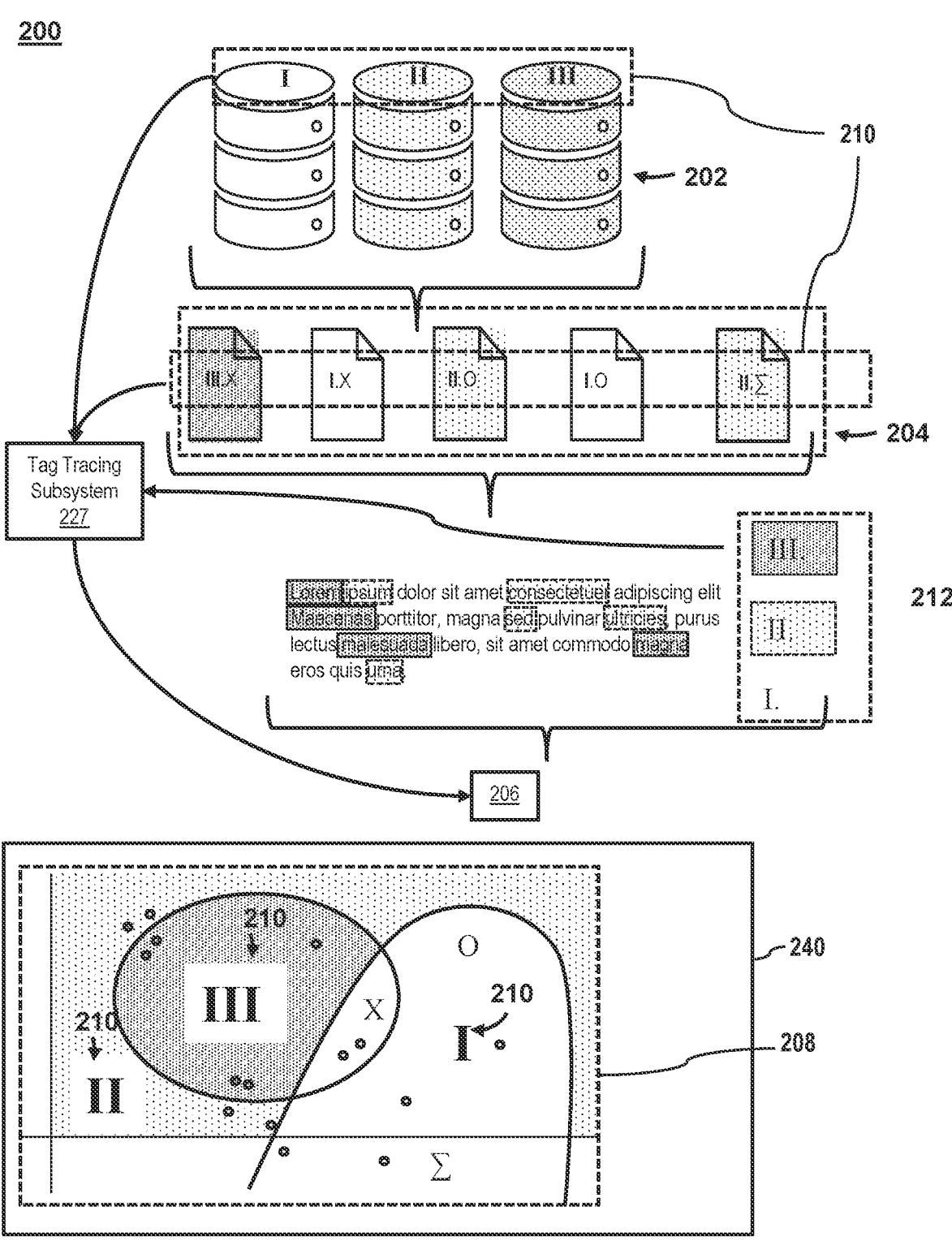
FIG. 2 shows an illustrative diagram of an architecture for tracing tags to documents, in accordance with one or more embodiments.

FIG. 2 shows an illustrative diagram of an architecture 200 for tracing tags to documents, in accordance with one or more embodiments. The architecture 200 includes a set of unique tags 210 associated with a score 206, where the set of unique tags 210 identifies or otherwise indicates a set of documents 204 used by a prediction model 240 to generate the score 206. In some embodiments, the prediction model 240 may include or otherwise have access to a knowledge graph 208. In some embodiments, the prediction model 240 may be structured or otherwise generated based on a transformer-based LLM. For example, the knowledge graph may be structured or otherwise generated based on GPT, BERT, etc. Some embodiments may use other types of models or tools to process or determine predictions based on a query, such as Word2Vec, One-Hot Encoding, GloVe, EIMO, LLAMA, PaLM2, etc. Some embodiments may configure or otherwise update the prediction model 240 by updating model parameters (e.g., weights, biases, or other parameters) of the prediction model 240. Some embodiments may update the prediction model 240 based on differences between its output predictions of the prediction model 240 and reference feedback information (e.g., user indication of accuracy, reference labels, or other information). In some embodiments, where the prediction model 240 may be or may include a neural network, connection weights may be adjusted to reconcile differences between the neural network's prediction and reference feedback information. Furthermore, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the prediction model 240 may trigger one or more subsystems to automatically perform additional remedial operations in response to an output of the prediction model 240. For example, based on a determination that a score provided by the prediction model 240 satisfies a threshold, some embodiments may store the score in a record and then perform one or more additional actions, such as lock an account indicated by a query, stop a computing system or subsystem from performing one or more operations, etc. Alternatively, some embodiments may log an output of the prediction model 240 without performing non-recording actions.

The set of directives are associated with a set of documents that are determined in response to a query received from a user with a user access level ("user security access level"). The query indicates a vulnerability (e.g., a cybersecurity threat to a system). The architecture 200 may include a tag tracing subsystem 227. The tag tracing subsystem may be associated with the knowledge graph 208 that is configured to determine a score 206 from a set of directives, where the set of directives may include numerical operations. In some embodiments, a system may present these directives in a user interface (UI) along with a set of text identifiers 212, where the set of text identifiers 212 may include text citations, alphanumeric document identifiers, titles, etc. Some embodiments may use a knowledge graph to quantify a cybersecurity risk into a score and provide citations for this score.

In some embodiments, the tag tracing subsystem 227 may associate a set of text identifiers 212 with the score 206 by tracing the set of unique tags 210. In some embodiments, the tag tracing subsystem 227 may associate the set of text identifiers 212 with the score 206 by determining a sequence of directives used to determine the score 206. The sequence of directives may be included in the set of directives or metadata associated with the set of directives, where the sequence of directives may be associated with the set of documents 204. Such embodiments may pair a relevant directive of the sequence of directives with an associated tag of the set of unique tags 210. In such embodiments, the document may be associated with the associated tag being a source document where the relevant directive originated, where the source document may be selected from the set of documents. For example, the sequence of directives may be presented on a UI displayed by a client computing device according to an order of operations.

In some embodiments, the set of text identifiers 212 may identify or provide address information for the set of documents 204. As disclosed elsewhere, the set of directives may originate from or be determined based on the set of documents 204 and be used to form the score 206. The tag tracing subsystem 227 may trace the set of unique tags 210 from the set of directives to the set of documents 204 to determine the set of text identifiers 212.

In some embodiments, a subset of directives taken from the set of directives is used to generate the score 206. For example, each unique tag of the set of unique tags 210 comprises a location in the knowledge graph 208. Some embodiments may trace the set of unique tags 210 by retrieving the set of documents 204 based on the respective location of each respective unique tag of the set of unique tags 210 in the knowledge graph 208 and parsing the set of documents 204 for relevant directives. Some embodiments may score the relevant directives according to a measure of similarity with the sequence of directives. Some embodiments may then indicate a set of source documents for the relevant directives based on the scores associated with the relevant directives.

In some embodiments, the set of documents 204 belongs to a database of documents, and the architecture 200 includes splitting the database of documents into a segmented corpora 202 before receiving the query from the user. In such embodiments, each corpus in the segmented corpora 202 is associated with a vulnerability type. For example, vulnerability types may include types of risk (e.g., product risk, infrastructure risk, privacy risks, etc.). When outputting a score, some embodiments may associate the score with the type of risk. The architecture 200 may also include tuning the knowledge graph with the segmented corpora 202 until the knowledge graph delineates a set of probabilistic relationships—each probabilistic relationship including at least two documents from the segmented corpora 202 and a degree of similarity between them. In still further embodiments, the set of documents 204 includes at least one document from each corpus in the segmented corpora 202 (as illustrated). In some embodiments, generating the score 206 includes applying a set of weights to the set of directives (from the set of documents) to bias the score 206 in favor of a subset of vulnerability types. Generating the score 206 then uses a weighted set of directives, illustrated by the relative size of text included in the score 206.

Figure 3:
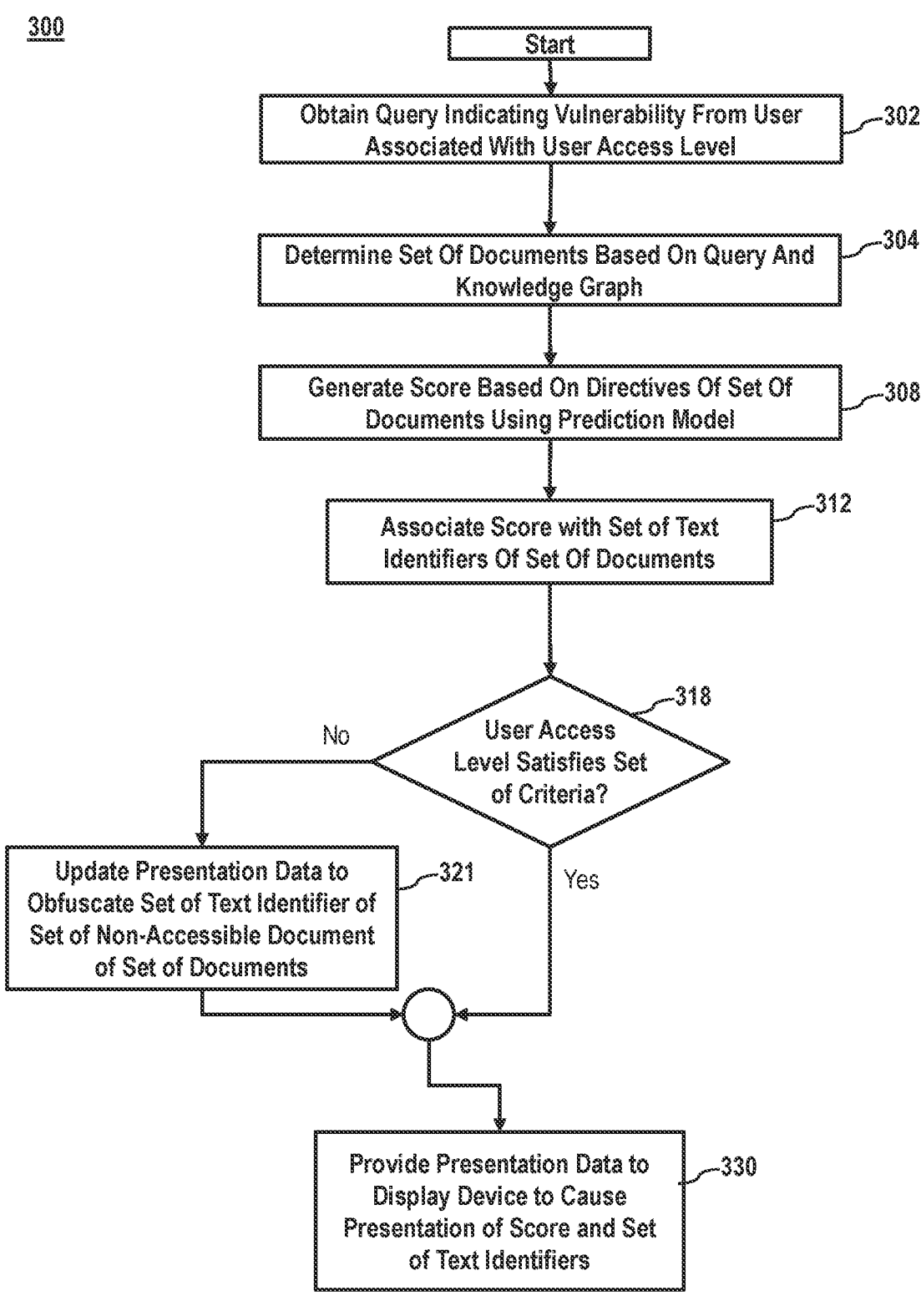
FIG. 3 shows a flowchart of a process used to determine a score and associated text identifiers of documents based on a query, in accordance with one or more embodiments.

FIG. 3 shows a flowchart of a process 300 used to determine a score and associated text identifiers of documents based on a query, in accordance with one or more embodiments. Some embodiments may obtain a query indicating a vulnerability from a user associated with a user access level, as indicated by block 302. The query may be obtained via a UI displayed on a client computing device, where the query may then be provided to a set of servers, a set of applications executing on a cloud computing service, etc. For example, some embodiments may receive a string representing a user query from a client computing device. Some embodiments may then generate a sequence of tokens based on the string and use the sequence of tokens as an input for an LLM or other prediction model.

In some embodiments, the query may be autonomously generated based on a detected set of events. For example, some embodiments may detect that a data breach event has occurred or collect metrics associated with the event (e.g., databases that have been breached, identifiers of records that have been accessed, amount of data accessed, type of data accessed, etc.). Some embodiments may then generate a query based on the metrics and provide the metrics to a language model described in this disclosure. For example, some embodiments may detect a breach event, generate a query indicating a quantity of data associated with the breach and a type of record that was accessed, and provide the query to a language model to obtain a vulnerability score.

Some embodiments may determine a set of documents based on a knowledge graph and the query, as indicated by block 304. The set of documents may be associated with a set of unique tags, where the tags may represent identifiers of the documents, categories of the documents, characteristics of the documents, etc. For example, the set of tags may include document object identifiers, document titles, document authors, etc. Some embodiments may determine the set of documents as a set of most similar documents associated with a set of unique tags by accessing a cybersecurity knowledge graph tuned by a segmented corpora of cybersecurity data. The cybersecurity knowledge graph may delineate probabilistic relationships between a plurality of cybersecurity documents contained within the segmented corpora.

In some embodiments, a knowledge graph may delineate probabilistic relationships by containing a vector space representation of a corpus of documents or content of the corpus of text documents. The corpus of documents may include or be associated with a domain category, such as cybersecurity. For example, the knowledge graph may include a vector space representation of cybersecurity knowledge that can be used to generate numerical responses to queries concerning threats and vulnerabilities. This cybersecurity knowledge can be represented by positions of language (e.g., words, tokens, lemmas, tuples, phrases, sentences, or paragraphs) taken from the documents in the corpus. For example, the positions of the language in the vector space representation are determined through a tuning process. The tuning process can include splitting each document into its constituent units of meaning and then counting the frequency of those units of meaning across the entire corpus. From these frequencies, conditional probabilities can be calculated from the frequency of another unit of meaning occurring in the same document. These conditional probabilities can be short range (e.g., the probability of a unit of meaning occurring given the presence of an immediately adjacent previous unit of meaning) or they can be long range (e.g., the probability of a unit of meaning occurring given another unit of meaning occurring earlier in the same sentence, earlier in the same paragraph, or earlier in the same document). Furthermore, the knowledge graph may include deterministic grammar rules in addition to the conditional probabilities mapped in the vector space, where such an inclusion may save processing power, memory, or other types of computing resources.

Some embodiments may tune a knowledge graph based on text sections, such as sentences, paragraphs, or other blocks of text. For example, some embodiments may use the positions of the paragraphs to tune a knowledge graph, where the positions of the paragraphs in the vector space may reflect larger patterns in the language of the documents in the corpus. Additionally, or alternatively, a knowledge graph can be tuned with words. For example, some embodiments may generate or update a knowledge graph such that positions of words or embedding representations of words in the vector space of the knowledge graph reflect the relationships between the words of the corpus. In some embodiments, the relationship between the words may be irrespective of larger trends of the documents in which they originated. Additionally, or alternatively, some embodiments may tune a knowledge graph with units of meaning possessing various sizes and configurations. For example, some embodiments may generate or update a knowledge graph such that a vector space of the knowledge graph may include an enriched mapping of the knowledge in a corpus by including additional vector elements, categories, or other values representing a knowledge domain, document context, sentiment, etc. For example, a knowledge graph may include a set of vectors such that each vector includes a first subset of additional vector elements representing a sentiment category and a second subset of additional vector elements representing a knowledge subdomain. Some embodiments may then output a category name or other identifier associated with these subsets of additional vector elements in response to a query to indicate that the query maps closest to these associated vector elements based on a distance in the vector space of the knowledge graph between the query and the corresponding vectors of the knowledge graph.

In some embodiments, the set of documents may include a similarity to a query, where the similarity is less than a similarity threshold. In such embodiments, receiving the query includes removing stop words and splitting the query into a set of tokens and then searching an index for the set of tokens, where the index may include a ranked list of tokens taken from past queries. Additionally, or alternatively, some embodiments may generate a second query in response to a first query, where using the second query may yield a second set of documents that includes a second similarity that is equal to or greater than the similarity threshold. Additionally, the second query may be based on a ranking of the set of tokens and a syntactic similarity measured between the second query and the set of tokens by the knowledge graph. In response to an input, such as an input obtained from the user at a client computing device, some embodiments may select the second query and determine a second set of documents based on the second query. As described elsewhere in this disclosure, some embodiments may and obtain a second set of directives stored in the second set of documents.

In some embodiments, the set of documents includes a set of nearest documents. In such embodiments, determining the set of nearest documents includes embedding the query using the knowledge graph and determining a set of distances between the embedded query and a representative sample of documents taken from the knowledge graph. In such embodiments, the process 300 includes determining the set of nearest documents based on the set of distances between the embedded query and the representative sample of documents.

For example, after obtaining a query, some embodiments may use a knowledge graph to measure the distances between the units of meaning that constitute the query to the nearest units of meaning from the corpus of documents, where the positions of meaning may be determined via a tuning process described in this disclosure. A knowledge graph vector space may include a different dimension for each unique unit of meaning as determined from a corpus of documents, where the unique unit of meaning may be represented by a unique tag. A unique tag may define an originating source document by providing text or information obtained from that originating source document with a dimension that is specific to that originating source document. The text or other information obtained from a first source document may be distinct from the text or other information obtained from other source documents. For example, the same tuple, "trojan horse," may exist as a first tuple of a first document and a second tuple of a second document, where both the first and second tuples may be mapped in the vector space of the knowledge graph. If the language from the query is mapped closer to the first tuple, then a citation to the first document may be included in or associated with a score generated based on the first tuple.

In some embodiments, determining the set of documents includes reducing the query to a set of query tokens and counting an incidence of the set of query tokens in a representative sample taken from the knowledge graph. For example, some embodiments may provide a query to a preprocessor subsystem to tokenize a natural language query by lemmatizing the words and then determining a sequence of words and sub-words from the lemmatized words of the query. Some embodiments may then use the sequence of words and sub-words and an input set of tokens for a prediction model to determine a set of documents using operations described in this disclosure.

Some embodiments may generate a score based on vulnerability directives of the set of most similar documents, as indicated by block 308. For example, some embodiments may use a knowledge graph to generate quantitative responses to queries, where the query may be manually provided by a user or automatically generated in response to a detected event. For example, a user can provide a first query to the knowledge graph mapped according to its vector space, where the first query may recite, "how much will it cost if hacker steals product Y and puts it online a week before we ship?" Some embodiments may then split the query into its constituent units of meaning by arranging the query into tokens of the token array ["product Y,"

"steals," "a week before we ship," and "how much will it cost"] based on a knowledge graph vector space. Some embodiments may generate a semantic pattern of this token array in the vector space based on the frequency of those units of meaning occurring relative to the frequency of other units of meaning. Furthermore, it should be understood that some embodiments may use factors other than frequency to generate patterns of semantic meaning in the knowledge graph vector space. Some embodiments may then use the semantic pattern to predict additional tokens based on an input token sequence and select documents or generate statements based on the input token sequence.

Some embodiments may configure a prediction model based on the set of most similar documents. For example, some embodiments may use a prediction model that includes a knowledge graph embedding model, where different portions of a knowledge graph may be mapped to different vectors in an embedding space. Some embodiments may modify the prediction model to use the corresponding vectors associated with the portions of a knowledge graph associated with the set of most similar documents. An association between the set of most similar documents and a portion of a knowledge graph may be based on a set of distances in the vector space of the knowledge graph between the set of most similar documents and an obtained query, where one or more distances of the set of distances may be below or equal to a threshold.

Alternatively, or additionally, some embodiments may use a prediction model to determine a score independently of any set of most similar documents. Furthermore, some embodiments may train a graph neural network or other neural network based on a knowledge graph such that the neural network may directly output one or more document text identifiers associated with one or more portions of the knowledge graph. For example, after being provided with a query, some embodiments may use a trained language model or other trained prediction model to obtain both generated text content and a set of text identifiers.

In some embodiments, the documents contained within the corpus include directives (e.g., mathematical operations). The knowledge graph measures the distances between the language in the query—as it has been mapped to the vector space of the knowledge graph—and the language from the corpus. The directives are taken from the nearest documents to the query and used to calculate a score (e.g., "final cost") as a response to the query. For example, the knowledge graph can find a document that includes the equation to calculate geometric Brownian motion (from the language in the query asking to determine a final price over time) and use that equation to calculate a final estimate in price using figures provided by the user or by documents from the corpus concerning product Y. As another example, some embodiments may use a set of LLM predictions or tags associated with the set of most similar documents to determine the presence and content of a set of directives of the set of most similar documents. For example, some embodiments may use an LLM to determine the presence of an equation "$C=g*T$" in a first document, where g is a constant defined in the first document, and where T is a measurement obtained from an automated sensor that is used to generate a query. Some embodiments may then use the formula "$C=g*T$" to determine a value for "C" and use "C" as a score. Values for g, operators, or other functions provided by a directive may be used as data quantifying cybersecurity vulnerabilities.

Some embodiments may obtain directives from multiple documents and combine them to determine a combined function that may be used to determine a score that can be presented to a user or otherwise used in this application. For example, some embodiments may determine that a first document includes a first equation "$C=(\frac{1}{2})*g*T^2$" that defines "C" as an output score. Some embodiments may then determine that a second document includes the phrase "metric T may be measured as the output of sensor f13 after normalizing by the maximum value 20." Some embodiments may then determine a value by using a prediction model (e.g., an LLM) to reduce the phrase into a second equation "T=f13.output/20." Some embodiments may then determine a score by determining "C" by first retrieving the value "f13.output" to compute "T" using the second equation and determining "C" based on the now-computed value of "T" based on the first equation. Furthermore, as discussed elsewhere in this disclosure, the sources of these directives may be tagged such that some embodiments may trace a determination of the score back to these directives or their corresponding source documents.

Some embodiments may generate a set of scores that include an estimated cost and a likelihood. For example, some embodiments may obtain a query indicating a potential vulnerability associated with a first named entity. Some embodiments may then determine a set of documents based on similarities between the query indicating the potential vulnerability and a set tokens of a knowledge graph, where the set of tokens is indicated as being associated with the set of documents. Some embodiments may then retrieve a set of directives of the set of documents to generate a set of functions representing a first function to compute an estimated cost and a second function to compute a likelihood associated with the estimated cost. Some embodiments may then provide the set of functions with information provided by the query to determine an estimated cost and an associated likelihood.

Some embodiments may generate a vulnerability mitigation plan, where a vulnerability mitigation plan may include text information that combines text data with the numerical score. For example, the text data may include natural language text describing operations to be performed in response to determining that a computed score exceeds a score threshold, where the computed score may represent a cost incurred by a cybersecurity threat posed in the query. In some embodiments, the computed score may instead be a default value.

Some embodiments may generate a vulnerability mitigation plan by first selecting a set of most similar documents closest in a vector space to a query. In some embodiments, the selected set of documents may include logged vulnerability data, where the logged vulnerability data may include previously computed or user-provided vulnerability scores or other scores. In some embodiments, a set of text identifiers of the selected set of documents may include line numbers and quotations from the set of documents and the set of text identifiers may include an identifier of text content representing a vulnerability mitigation plan.

Some embodiments may select a set of documents based on distances in the vector space used to determine the most similar documents that may represent a measure of the conditional likelihood between the words of the vector space. Some embodiments may then select text in the most similar documents associated with a set of tokens representing a vulnerability mitigation plan. Some embodiments may then use the words of that text as the text of a vulnerability mitigation plan, where some embodiments may present text information in order of greatest probability to least probability with respect to the computed distances in the vector space. Alternatively, or additionally, some embodiments may detect the existence of metadata that indicates portions of the text in the most similar documents as storing a vulnerability mitigation plan and provide the portions of the text based on the metadata.

Some embodiments may associate the vulnerability score with a set of text identifiers of the set of cybersecurity documents, as indicated by block 312. Some embodiments may associate the set of text identifiers with a vulnerability score by tracing the unique tag of each document in the set of most similar documents. For example, some embodiments may determine a set of five most similar documents based on a knowledge graph using operations described in this disclosure and then determine a vulnerability score based on the set of five most similar documents. Some embodiments may then associate document identification numbers of the set of five most similar documents with the determined vulnerability score, where a document identification number may be a type of text identifier.

Some embodiments may determine whether a user access level satisfies a set of criteria, as indicated by block 318. Some embodiments may determine a user access level by determining a user identifier associated with the query and then retrieving a user record indicating the user access level associated with the user. For example, some embodiments may determine that a query was generated by a user or an application associated with a user record and then search the user record to retrieve a user access level. Some embodiments may then determine whether the user access level satisfies a set of criteria associated with a set of access levels associated with the security of a set of documents. Furthermore, it should be understood that a user may represent an individual human user, a machine user, an organization, an entity, etc. In some embodiments, a user access level may be assigned to a specific user via a user record. Alternatively, or additionally, a user access level may be assigned to a group of users, such as being assigned to a category such that all users classified under the category have the user access level. Furthermore, while a user access level may be a numeric value or other value sorted in a sequence of values (e.g., an alphabetical order), a user access level may instead include a category or a combination of category and value of a sequence of values.

In some embodiments, the set of criteria may be based on the security access level associated with one or more documents of the set of most similar documents. For example, satisfying a set of criteria may include determining that a value of a user access level is equal to or exceeds that of a minimum required access level of the set of documents, where a set of access levels associated with the security of the set of documents may indicate restrictions on who or what has permission to view the set of documents. Some embodiments may test a user access level with an indicated access level of each document in the set of most similar documents. For example, if a user access level is equal to "51" and a minimum required access level of a first document is "40," some embodiments may determine that the user access level satisfies a criterion based on the access level of the first document. Alternatively, if a user access level does not satisfy the minimum required access level, then the user may be prevented access to the document associated with the minimum required access level, where the document may be described as a "non-accessible document" with respect to a user or other entity.

As described elsewhere, a user access level of a user may be stored as a category. For example, a first user access level may include the value "LEVEL BLUE," where documents may be associated with different categories representing a security access level. For example, a first document may be associated with the security access category "LEVEL BLUE" and a second document may be associated with the security access category "LEVEL RED." In some embodiments, the set of criteria may include one or more matching criteria. For example, some embodiments may determine that, based on a match between the first user access level and the security access category of the first document, the set of criteria for the first document is satisfied. Some embodiments may further determine that, based on a mismatch between the first user access level and the security access category of the second document, the set of criteria for the second document is not satisfied and the second document is a non-accessible document with respect to the user.

In response to a determination that a user access level does satisfy the set of criteria, operations of the process 300 may proceed to operations described for block 330. Otherwise, operations of the process 300 may proceed to operations described for block 321.

Some embodiments may update presentation data to obfuscate one or more of the text identifiers of one or more non-accessible documents of the set of documents, as indicated by block 321. Some embodiments may generate or otherwise update presentation data such that a display device displaying a UI based on the presentation data will hide a first text identifier of a non-accessible document. For example, after determining that a user-provided query includes a first text identifier of an accessible document and a second text identifier of a non-accessible document, some embodiments may generate presentation data that includes an obfuscation tag associated with the second text identifier. As described elsewhere in this disclosure, some embodiments may then provide the presentation data to a display device. In some embodiments, the presentation data may cause the display device to present a UI that includes a score and the first text identifier without including the second text identifier. Alternatively, or additionally, some embodiments may generate a redaction indicator associated with second text identifier when generating the presentation data, where a display device presenting a UI based on the presentation data may present a black box or other non-document-identifying shape in lieu of the second text identifier.

Some embodiments may provide the presentation data to a display device to cause the presentation of a score and set of text identifiers, as indicated by block 330. Some embodiments may generate or otherwise update presentation data that includes a generated score and an associated set of identifiers and then send the presentation data to a client computing device for display. Alternatively, some embodiments may have direct control or access to a display device and may provide the presentation data to the display device. The controlled display device may then present a UI that includes the generated score and the associated set of identifiers. Furthermore, as described elsewhere in this disclosure, some embodiments may modify presentation data such that the display device does not present one or more text identifiers associated with non-accessible documents.

Some embodiments may receive additional information from a user or a data source indicating an actual value to be compared with an associated score. For example, some embodiments may use operations described in this disclosure to determine an estimated cost based on a first query by using a knowledge graph or a prediction model generated based on the knowledge graph. Some embodiments may then obtain an actual cost from a user and compare the actual cost with the estimated cost. If the difference between the actual and estimated costs exceeds a threshold, some embodiments may then update a prediction model by generating a new document that includes the query and the score, updating a training dataset based on the new document, and retraining the prediction model based on the updated training dataset. Alternatively, or additionally, some embodiments may update a knowledge graph based on the new document, where one or more tokens of the new document may be incorporated into the vector space of the knowledge graph.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, or without one or more of the operations discussed. Additionally, the order in which the processing operations of the methods are illustrated in this disclosure is not intended to be limiting.

As discussed elsewhere in this disclosure, The system 100 may include an API layer. The API layer may allow the system to generate summaries across different devices. In some embodiments, the API layer may be implemented on the client computing device 102. Alternatively or additionally, the API layer may reside on one or more of the subsystems 124-128. The API layer (which may be A REST or Web services API layer) may provide a decoupled interface to data or functionality of one or more applications. The API layer may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise.

Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, computer-readable media, such as an electronic storage medium. Furthermore, the use of the term "media" may include a single medium or combination of multiple media, such as a first medium and a second medium. One or more non-transitory, computer-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations described in FIGS. 2-3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-123 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. One or more non-transitory, computer-readable media, comprising instructions that, when executed by one or more processors, cause operations comprising: receiving a query associated with an access level; determining a set of documents based on the query and a knowledge graph; determining a score based on a set of directives; determining whether the access level satisfies a set of criteria; in response to a result indicating that the access level satisfies the set of criteria, associating a set of text identifiers with the score by tracing a set of tags; and storing, in a set of database records, the score and the set of text identifiers.

2. A method of embodiment 2, wherein the set of documents is associated with the set of tags, the set of directives, and the set of criteria.

3. A system for retrieving text identifiers of documents used by a large language model to determine security vulnerabilities based on cybersecurity knowledge graphs, the system comprising one or more processors and one or more non-transitory media storing program instructions that, when executed by the one or more processors, perform operations comprising: receiving a query indicating a vulnerability from a user with a user security access level; in response to the query, determining a set of most similar documents associated with a set of unique tags by: accessing a cybersecurity knowledge graph tuned by a segmented corpora of cybersecurity data, wherein the cybersecurity knowledge graph delineates probabilistic relationships between a plurality of cybersecurity documents of the segmented corpora, and wherein each cybersecurity document of the set of cybersecurity documents comprises a unique tag, a security access level, and a vulnerability directive comprising data for quantifying cybersecurity vulnerabilities; and determining the set of most similar documents based on the cybersecurity knowledge graph; generating a vulnerability score using vulnerability directives of the set of most similar documents; determining whether the user security access level satisfies a set of criteria based on the security access level of each document of the set of most similar documents; in response to a result indicating that the security access level of the user satisfies the set of criteria, associating a set of text identifiers of the set of cybersecurity documents with the vulnerability score by tracing the unique tag of each document of the set of most similar documents determined to be most similar by the cybersecurity knowledge graph to determine the set of text identifiers for the vulnerability score; and displaying, on a user interface, the vulnerability score and the set of text identifiers.

4. A method comprising: receiving a query indicating a vulnerability from a user with a user access level; in response to the query, determining a set of documents based on a knowledge graph, wherein the set of documents is associated with a set of unique tags, a set of directives, and a set of access levels; generating a score based on the set of directives of the set of documents; determining a result indicating that the user access level satisfies a set of criteria based on the set of access levels of the set of documents; in response to the result indicating that the user access level satisfies the set of criteria, associating a set of text identifiers of the set of documents with the score by tracing the set of unique tags to determine the set of text identifiers; and presenting, in a user interface, the score and the set of text identifiers.

5. The method of any of embodiments 1 to 4, wherein the result is a first result, the method further comprises: receiving a second query from a second user with a second user access level; in response to the second query, determining a second set of documents based on the knowledge graph, wherein the second set of documents is associated with a second set of unique tags, a second set of directives, and a second set of access levels; generating a second score based on the second set of directives of the second set of documents; determining a second result indicating that the second user access level satisfies a second set of criteria based on the second set of access levels; and in response to the second result indicating that the second user access level does not satisfy the second set of criteria, redacting a second set of text identifiers by obfuscating the second set of directives and the second set of documents used to generate the second score from a presentation of the second set of documents.

6. The method of any of embodiments 1 to 5, wherein the set of documents further comprises logged vulnerability data, and wherein generating the score comprises: generating a vulnerability mitigation plan using the logged vulnerability data of the set of documents, wherein the set of text identifiers comprises line numbers and quotations of the set of documents.

7. The method of any of embodiments 1 to 6, wherein the set of documents comprises a set of nearest documents, and wherein determining the set of nearest documents comprises: creating an embedded query by embedding the query using the knowledge graph; determining a set of distances between the embedded query and a representative sample of documents of the knowledge graph; and determining the set of nearest documents based on the set of distances between the embedded query and the representative sample of documents.

8. The method of any of embodiments 1 to 7, wherein determining the set of documents comprises: reducing the query to a set of query tokens; counting an incidence of the set of query tokens in a representative sample of the knowledge graph; and determining the set of documents based on the incidence of each query token of the set of query tokens in each document of the representative sample.

9. The method of any of embodiments 1 to 8, wherein the set of documents comprises a similarity to the query, and wherein the similarity is less than a similarity threshold, and wherein receiving the query further comprises: removing stop words and splitting the query into a set of tokens; searching an index for the set of tokens, wherein the index is a ranked list of tokens of past queries; recommending a second query to yield a second set of documents comprising a second similarity equal to or greater than the similarity threshold, wherein the second query is based on a ranking of the set of tokens and a syntactic similarity measured between the second query and the set of tokens, and wherein the syntactic similarity is based on the knowledge graph; and in response to an input indicating a selection of the second query by the user, generating a second score based on a second set of directives of the second set of documents.

10. The method of any of embodiments 1 to 9, wherein associating the set of text identifiers with the score comprises: separating the score into a sequence of directives of the set of directives associated with the set of documents; and pairing a relevant directive of the sequence of directives with an associated tag of the set of unique tags, wherein a source document of the set of documents comprises the relevant directive and the associated tag.

11. The method of embodiment 10, wherein a subset of directives is used to generate the score, the subset of directives of the set of directives, and wherein each unique tag of the set of unique tags comprises a location in the knowledge graph, and wherein tracing the set of unique tags comprises: retrieving the set of documents based on the location of each unique tag in the knowledge graph; parsing the set of documents for relevant directives, wherein the relevant directives are scored according to a measure of similarity with the sequence of directives; and indicating a set of source documents for the relevant directives.

12. The method of any of embodiments 1 to 11, wherein prior to receiving the query the method comprises: splitting a database of documents into a segmented corpora, wherein each corpus in the segmented corpora is associated with a vulnerability type; and tuning the knowledge graph with the segmented corpora until the knowledge graph delineates a set of probabilistic relationships, each probabilistic relationship comprising two documents of the segmented corpora and a degree of similarity between them.

13. The method of embodiment 12, wherein the set of documents comprises at least one document of each corpus in the segmented corpora, and wherein generating the score further comprises: applying a set of weights to the set of directives of the set of documents to bias the score in favor of a subset of vulnerability types; and generating the score using a weighted set of directives.

14. The method of any of embodiments 1 to 13, the operations further comprising: receiving a second query associated with the access level; determining a second set of documents based on the second query and the knowledge graph, wherein the second set of documents is associated with a second set of tags, a second set of directives, and a second set of criteria; determining a second score based on the second set of directives; determining whether the access level satisfies the second set of criteria; and in response to a second result indicating that the access level does not satisfy the second set of criteria, redacting a second set of text identifiers by obfuscating the second set of directives and the second set of documents used to determine the second score.

15. The method of any of embodiments 1 to 14, wherein the score comprises a plan to mitigate a vulnerability, and wherein the set of text identifiers comprises line numbers and quotations of the set of documents.

16. The method of any of embodiments 1 to 15, wherein the score comprises an estimated cost and a likelihood, and wherein the set of text identifiers comprises a sequence of the set of directives used to determine the estimated cost and the likelihood.

17. The method of any of embodiments 1 to 16, wherein the set of documents comprises a set of nearest documents, and wherein processing the query to determine the set of nearest documents comprises: creating an embedded query by embedding the query using the knowledge graph; determining a distance between the embedded query and each document in a representative sample of the knowledge graph; and determining the set of nearest documents based on the distance between the embedded query and each document in the representative sample.

18. The method of any of embodiments 1 to 17, wherein processing the query to determine the set of documents comprises: reducing the query to a set of query tokens; counting an incidence of each query token in each document of a representative sample of the knowledge graph; and determining the set of documents based on the incidence of each query token in each document of the representative sample.

19. The method of any of embodiments 1 to 18, wherein prior to receiving the query the operations comprise: splitting a database of documents into a segmented corpora, wherein each corpus in the segmented corpora relates to a vulnerability type; and tuning the knowledge graph with the segmented corpora until the knowledge graph delineates a set of probabilistic relationships, each probabilistic relationship comprising two documents of the segmented corpora and a degree of similarity between them.

20. The method of any of embodiments 1 to 19, wherein the query indicates a potential vulnerability, and wherein the score comprises an estimated cost and a likelihood of the potential vulnerability occurring, and wherein the set of text identifiers indicates a sequence of the set of directives used to determine the estimated cost and the likelihood.

21. The method of embodiment 20, wherein the operations further comprise: comparing the estimated cost to an actual cost; determining an evaluation of the knowledge graph based on a comparison of the estimated cost to the actual cost; updating the knowledge graph based on the evaluation; and saving the query as a new document of the knowledge graph, wherein the new document comprises logged vulnerability data comprising the query, the potential vulnerability, the score, and the evaluation.

22. One or more tangible, non-transitory, machine-readable media storing instructions that, when executed by a set of processors, cause the set of processors to effectuate operations comprising those of any of embodiments 1-21.

23. A system comprising: a set of processors and memory storing computer program instructions that, when executed by the set of processors, cause the set of processors to effectuate operations comprising those of any of embodiments 1-21.

What is claimed is:

1. A system for retrieving text identifiers of documents used by a large language model to determine security vulnerabilities based on cybersecurity knowledge graphs, the system comprising one or more processors and one or more non-transitory media storing program instructions that, when executed by the one or more processors, perform operations comprising:

receiving a query indicating a vulnerability from a user with a user security access level;

in response to the query, determining a set of most similar documents associated with a set of unique tags by:

accessing a cybersecurity knowledge graph tuned by a segmented corpora of cybersecurity data, wherein the cybersecurity knowledge graph delineates probabilistic relationships between at least two documents of a set of cybersecurity documents of the segmented corpora, and wherein each cybersecurity document of the set of cybersecurity documents comprises a unique tag, a security access level, and a vulnerability directive comprising data for quantifying cybersecurity vulnerabilities; and determining the set of most similar documents based on the cybersecurity knowledge graph;

generating a vulnerability score using vulnerability directives of the set of most similar documents;

determining that the user security access level satisfies a set of criteria based on the security access level of each document of the set of most similar documents;

in response to determining that the user security access level of the user satisfies the set of criteria, associating a set of text identifiers of the set of cybersecurity documents with the vulnerability score by:

identifying a sequence of directives of the vulnerability directives used to generate the vulnerability score;

pairing a relevant directive of the sequence of directives with an associated tag of the set of unique tags, wherein a source document of the set of most similar documents comprises the relevant directive and the associated tag; and tracing the unique tag of each document of the set of most similar documents determined to be most similar by the cybersecurity knowledge graph to determine the set of text identifiers for the vulnerability score, wherein the tracing comprises:

retrieving the set of cybersecurity documents based on a respective location of each respective unique tag of the set of unique tags in the cybersecurity knowledge graph; and parsing the set of cybersecurity documents for relevant directives, wherein the relevant directives are scored according to a measure of similarity with the sequence of directives; and displaying, on a user interface, the vulnerability score, the set of text identifiers, and one or more indications of a set of source documents of the set of most similar documents for the relevant directives.

2. A method comprising:

receiving a query indicating a vulnerability from a user with a user security access level;

in response to the query, determining a set of most similar documents associated with a set of unique tags by:

accessing a cybersecurity knowledge graph tuned by a segmented corpora of cybersecurity data, wherein the cybersecurity knowledge graph delineates probabilistic relationships between at least two documents of a set of cybersecurity documents of the segmented corpora, and wherein each cybersecurity document of the set of cybersecurity documents comprises a unique tag, a security access level, and a vulnerability directive comprising data for quantifying cybersecurity vulnerabilities; and determining the set of most similar documents based on the cybersecurity knowledge graph;

generating a vulnerability score using vulnerability directives of the set of most similar documents;

determining that the user security access level satisfies a set of criteria based on the security access level of each document of the set of most similar documents;

in response to determining that the user security access level of the user satisfies the set of criteria, associating a set of text identifiers of the set of cybersecurity documents with the vulnerability score by:

identifying a sequence of directives of the vulnerability directives used to generate the vulnerability score;

pairing a relevant directive of the sequence of directives with an associated tag of the set of unique tags, wherein a source document of the set of most similar documents comprises the relevant directive and the associated tag; and tracing the unique tag of each document of the set of most similar documents determined to be most similar by the cybersecurity knowledge graph to determine the set of text identifiers for the vulnerability score, wherein the tracing comprises:

retrieving the set of cybersecurity documents based on a respective location of each respective unique tag of the set of unique tags in the cybersecurity knowledge graph; and parsing the set of cybersecurity documents for relevant directives, wherein the relevant directives are scored according to a measure of similarity with the sequence of directives; and displaying, on a user interface, the vulnerability score, the set of text identifiers, and one or more indications of a set of source documents of the set of most similar documents for the relevant directives.

3. The method of claim 2, further comprising:

receiving a second query from a second user with a second user access level;

in response to the second query, determining a second set of documents based on the cybersecurity knowledge graph, wherein the second set of documents is associated with a second set of unique tags, a second sequence of directives, and a second set of access levels;

generating a second score based on the second sequence of directives of the second set of documents;

determining that the second user access level satisfies a second set of criteria based on the second set of access levels; and in response to determining that the second user access level does not satisfy the second set of criteria, redacting a second set of text identifiers by obfuscating the second sequence of directives and the second set of documents used to generate the second score from a presentation of the second set of documents.

4. The method of claim 2, wherein the set of most similar documents further comprises logged vulnerability data, and wherein generating the vulnerability score comprises:

generating a vulnerability mitigation plan using the logged vulnerability data of the set of most similar documents, wherein the set of text identifiers comprises line numbers and quotations of the set of most similar documents.

5. The method of claim 2, wherein the set of most similar documents comprises a set of nearest documents, and wherein determining the set of nearest documents comprises:

creating an embedded query by embedding the query using the cybersecurity knowledge graph;

determining a set of distances between the embedded query and a representative sample of documents of the cybersecurity knowledge graph; and determining the set of nearest documents based on the set of distances between the embedded query and the representative sample of documents.

6. The method of claim 2, wherein determining the set of most similar documents comprises:

reducing the query to a set of query tokens;

counting an incidence of the set of query tokens in a representative sample of the cybersecurity knowledge graph; and determining the set of most similar documents based on the incidence of each query token of the set of query tokens in each document of the representative sample.

7. The method of claim 2, wherein the set of most similar documents is associated with a first similarity value indicating a similarity between the set of most similar documents and the query, and wherein the first similarity value is less than a similarity threshold, and wherein receiving the query comprises:

removing stop words and splitting the query into a set of tokens;

searching an index for the set of tokens, wherein the index is a ranked list of tokens of past queries;

recommending a second query to yield a second set of documents and a second similarity value that is associated with the second set of documents and is equal to or greater than the similarity threshold, wherein the second query is determined based on a ranking of the set of tokens and a syntactic similarity measured between the second query and the set of tokens, and wherein the syntactic similarity is based on the cybersecurity knowledge graph; and in response to an input indicating a selection of the second query by the user, generating a second score based on a second sequence of directives of the second set of documents.

8. The method of claim 2, wherein prior to receiving the query the method comprises:

splitting a database of documents into the segmented corpora, wherein each corpus in the segmented corpora is associated with a vulnerability type; and tuning the cybersecurity knowledge graph with the segmented corpora until the cybersecurity knowledge graph delineates a set of probabilistic relationships, each probabilistic relationship comprising two documents of the segmented corpora and a degree of similarity between them.

9. The method of claim 8, wherein the set of most similar documents comprises at least one document of each corpus in the segmented corpora, and wherein generating the vulnerability score comprises:

applying a set of weights to the sequence of directives of the set of most similar documents to bias the vulnerability score in favor of a subset of vulnerability types; and generating the vulnerability score using a weighted set of directives.

10. One or more non-transitory, computer-readable media, comprising instructions that, when executed by one or more processors, cause operations comprising:

receiving a query indicating a vulnerability from a user with a user security access level;

in response to the query, determining a set of most similar documents associated with a set of unique tags by:

accessing a cybersecurity knowledge graph tuned by a segmented corpora of cybersecurity data, wherein the cybersecurity knowledge graph delineates probabilistic relationships between at least two documents of a set of cybersecurity documents of the segmented corpora, and wherein each cybersecurity document of the set of cybersecurity documents comprises a unique tag, a security access level, and a vulnerability directive comprising data for quantifying cybersecurity vulnerabilities; and determining the set of most similar documents based on the cybersecurity knowledge graph;

generating a vulnerability score using vulnerability directives of the set of most similar documents;

determining that the user security access level satisfies a set of criteria based on the security access level of each document of the set of most similar documents;

in response to determining that the user security access level of the user satisfies the set of criteria, associating a set of text identifiers of the set of cybersecurity documents with the vulnerability score by:

identifying a sequence of directives of the vulnerability directives used to generate the vulnerability score;

pairing a relevant directive of the sequence of directives with an associated tag of the set of unique tags, wherein a source document of the set of most similar documents comprises the relevant directive and the associated tag; and tracing the unique tag of each document of the set of most similar documents determined to be most similar by the cybersecurity knowledge graph to determine the set of text identifiers for the vulnerability score, wherein the tracing comprises:

retrieving the set of cybersecurity documents based on a respective location of each respective unique tag of the set of unique tags in the cybersecurity knowledge graph; and parsing the set of cybersecurity documents for relevant directives, wherein the relevant directives are scored according to a measure of similarity with the sequence of directives; and displaying, on a user interface, the vulnerability score, the set of text identifiers, and one or more indications of a set of source documents of the set of most similar documents for the relevant directives.

11. The one or more non-transitory, computer-readable media of claim 10, the operations further comprising:

receiving a second query associated with the user security access level;

determining a second set of documents based on the second query and the cybersecurity knowledge graph, wherein the second set of documents is associated with a second set of tags, a second sequence of directives, and a second set of criteria;

determining a second score based on the second sequence of directives;

determining whether the user security access level satisfies the second set of criteria; and in response to a second result indicating that the user security access level does not satisfy the second set of criteria, redacting a second set of text identifiers by obfuscating the second sequence of directives and the second set of documents used to determine the second score.

12. The one or more non-transitory, computer-readable media of claim 10, wherein the vulnerability score comprises a plan to mitigate a vulnerability, and wherein the set of text identifiers comprises line numbers and quotations of the set of most similar documents.

13. The one or more non-transitory, computer-readable media of claim 10, wherein the vulnerability score comprises an estimated cost and a likelihood, and wherein the set of text identifiers comprises a sequence of the sequence of directives used to determine the estimated cost and the likelihood.

14. The one or more non-transitory, computer-readable media of claim 10, wherein the set of most similar documents comprises a set of nearest documents, and wherein processing the query to determine the set of nearest documents comprises:

creating an embedded query by embedding the query using the cybersecurity knowledge graph;

determining a distance between the embedded query and each document in a representative sample of the cybersecurity knowledge graph; and determining the set of nearest documents based on the distance between the embedded query and each document in the representative sample.

15. The one or more non-transitory, computer-readable media of claim 10, wherein processing the query to determine the set of most similar documents comprises:

reducing the query to a set of query tokens;

counting an incidence of each query token in each document of a representative sample of the cybersecurity knowledge graph; and determining the set of most similar documents based on the incidence of each query token in each document of the representative sample.

16. The one or more non-transitory, computer-readable media of claim 10, wherein prior to receiving the query the operations comprise:

splitting a database of documents into the segmented corpora, wherein each corpus in the segmented corpora relates to a vulnerability type; and tuning the cybersecurity knowledge graph with the segmented corpora until the cybersecurity knowledge graph delineates a set of probabilistic relationships, each probabilistic relationship comprising two documents of the segmented corpora and a degree of similarity between them.

17. The one or more non-transitory, computer-readable media of claim 10, wherein the query indicates a potential vulnerability, and wherein the vulnerability score comprises an estimated cost and a likelihood of the potential vulnerability occurring, and wherein the set of text identifiers indicates a sequence of the sequence of directives used to determine the estimated cost and the likelihood.

18. The one or more non-transitory, computer-readable media of claim 17, wherein the operations further comprise:

comparing the estimated cost to an actual cost;

determining an evaluation of the cybersecurity knowledge graph based on a comparison of the estimated cost to the actual cost;

updating the cybersecurity knowledge graph based on the evaluation; and saving the query as a new document of the cybersecurity knowledge graph, wherein the new document comprises logged vulnerability data comprising the query, the potential vulnerability, the vulnerability score, and the evaluation.

\* \* \* \* \*